UNITED STATES PATENT OFFICE.

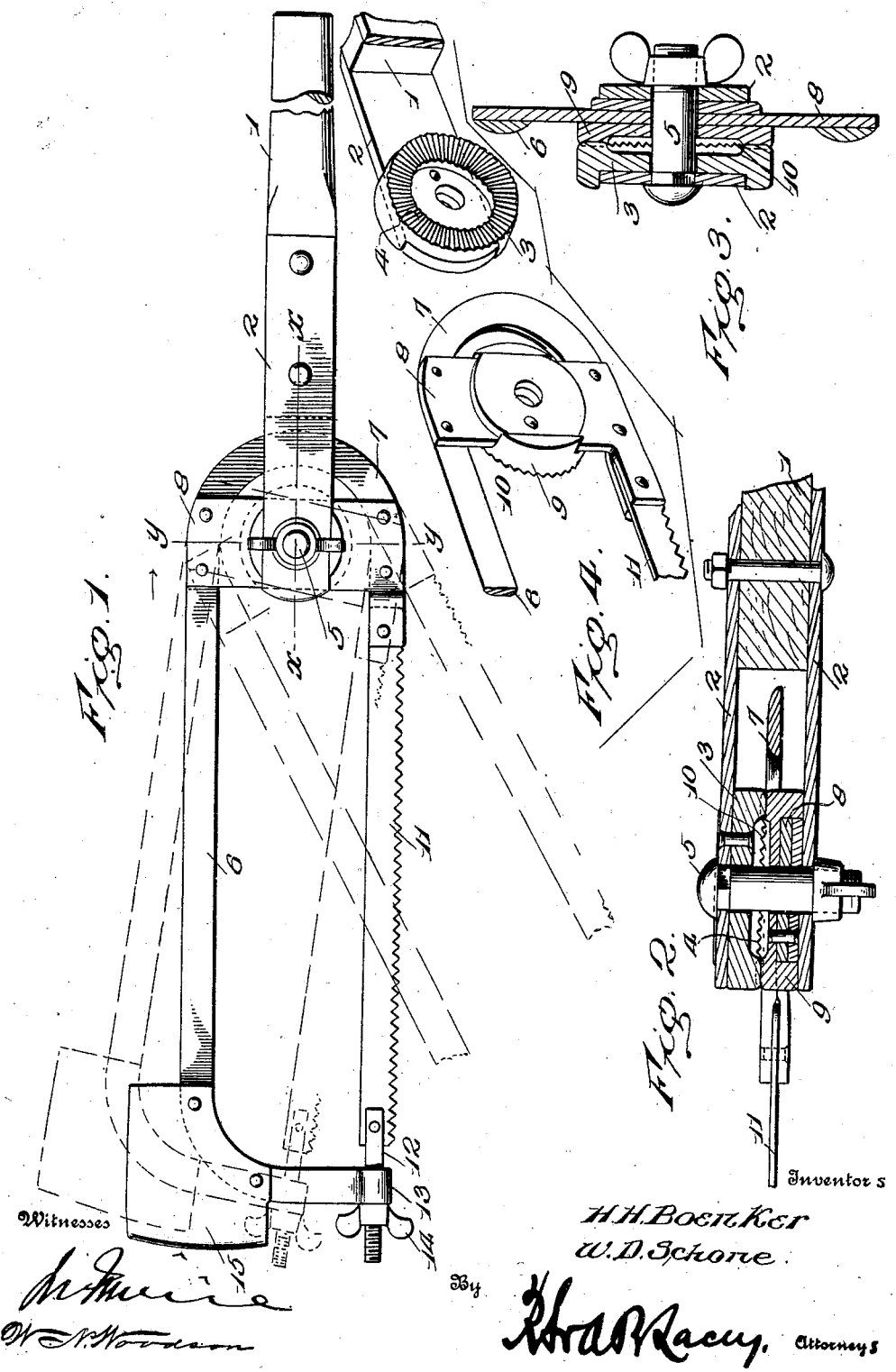

HENRY H. BOENKER AND WILLIAM D. SCHONE, OF ST. CHARLES, MISSOURI.

PRUNING IMPLEMENT.

No. 924,882.  Specification of Letters Patent.  Patented June 15, 1909.

Application filed March 14, 1908. Serial No. 420,996.

*To all whom it may concern:*

Be it known that we, HENRY H. BOENKER and WILLIAM D. SCHONE, citizens of the United States, residing at St. Charles, in the county of St. Charles and State of Missouri, have invented certain new and useful Improvements in Pruning Implements, of which the following is a specification.

The present invention provides an implement of novel construction intended more particularly for trimming trees, said implement comprising a pole or staff having a saw and cutting blade at its upper end, said saw being adjustable so as to be turned to any angle with reference to the pole to enable branches or limbs of trees to be readily reached and cut without binding the blade.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a side view of an implement embodying the invention, the dotted lines showing an adjusted position of the saw. Fig. 2 is a longitudinal section on the line $x$—$x$ of Fig. 1. Fig. 3 is a transverse section on the line $y$—$y$ of Fig. 1. Fig. 4 is a detail perspective view of a portion of the saw frame and the adjacent end of the pole or staff, the parts being separated.

Corresponding and like parts are referred to in the following description and indicated in all the views of the drawings by the same reference characters.

The implement comprises a pole or staff 1. Plates 2 are secured to opposite sides of an end portion of the pole and project a short distance beyond the same to receive the pivoted end of the saw frame. A washer 3 is provided upon the inner side of an end portion of one of the plates 2 and is provided with a circular series of teeth 4. The outer side of the washer 3 is channeled to form a seat in which the projecting end of the plate 2 sustaining said washer, is fitted. The washer 3 may be secured to its supporting plate in any manner and is prevented from turning by the shoulders at opposite sides of the channel or seat engaging with opposite edge portions of the plate. The projecting ends of the plates 2 are apertured to receive a bolt or fastening 5 by means of which the saw frame is secured to the projecting ends of the plates in the required adjusted position.

The saw frame 6 is approximately of bow-form. The inner end 7 of the saw frame is approximately of U-form, the side members being connected by means of a plate 8 which is secured by rivets or in any manner at its ends thereto. The plate 8 performs the double office of connecting the side members of the end 7, as also providing a support for a washer 9, which is similar in formation to the washer 3. One face of the washer 9 is provided with a circular series of teeth 10 to match the teeth 4 of the washer 3, and the opposite face of said washer is channeled to form a seat in which the plate 8 is fitted. The washer 9 may be secured to the plate 8 in any manner so as to prevent displacement.

The shoulders at opposite sides of the channel or seat engaging with opposite edges of the plate 8, prevent turning of the washer 9 when the implement is in operation. The washer 9 and plate 8 are apertured to receive the bolt or fastening 5. When the parts are assembled, the end 7 of the saw frame is thrust between the projecting ends of the plates 2, and the washers 3 and 9 lie along side each other with their teeth 4 and 10 in mesh, thereby preventing possible displacement of the saw frame after the bolt 5 has been tightened. The saw blade 11 is connected at one end to the extremity of the free member of the U-shaped end 7 of the saw frame, and the opposite end of said saw blade is connected to a rod 12 which passes loosely through an eye 13 at the outer end of the saw frame 6, the projecting end of the rod 12 being threaded and receiving a thumb nut 14 by means of which the saw blade 11 is subjected to proper tension. A blade 15 is secured to the outer end of the saw frame 6 and its projecting edges are sharpened to form cutters. The blade 15 is secured to the outer corner of the saw frame, thereby serving to stiffen the same at the bend and also coming in line with the main portion of the saw frame so as to withstand the thrust incident to the use of the implement when lopping off branches of trees when trimming or pruning the same.

The projecting ends of the plates 2 are normally sprung apart a distance to admit of the inner end of the saw frame being placed in position and also of the washers 3 and 9 separating to cause their toothed portions to clear one another when the bolt or fastening 5 is loosened, as when changing the inclination of the saw with reference to the pole or staff. Upon tightening the bolt or fastening 5, the projecting ends of the plates 2 are drawn together, thereby causing the teeth 4 and 10 of the companion washers to interlock and secure the saw in the required angular position.

When trimming a tree, it may be of advantage to change the inclination of the saw either to avoid branches or to prevent binding of the saw, and this may be readily effected by loosening the bolt 5 and turning the saw frame thereon to the required position, after which a retightening of the bolt 5 secures the saw so that the desired work may be effectively and conveniently carried out.

Having thus described the invention, what is claimed as new is:

1. In an implement of the character specified, the combination of a pole provided with spaced extensions, a saw frame having its inner end of approximately U-form and placed between said spaced extensions, a plate connecting the members of said inner end of the saw frame, a washer fitted to said plate and toothed upon one side, a companion washer fitted to the spaced extension having the first mentioned washer and toothed on the side adjacent the latter, and a fastening for clamping said spaced extensions against opposite sides of the saw frame and securing the washers in place and to each other.

2. In an implement of the character specified, the combination of a pole, plates secured to said pole and extended outward therefrom to provide spaced extensions, a saw frame having its inner end of approximately U-form and placed between said spaced extensions, a plate connecting the members of the inner end of the saw frame, and washer recessed in one side of the saw frame to receive the said plate and having its other side toothed, a second washer recessed in one side to receive one of said spaced extensions and toothed upon the other side to match and coöperate with the tooth of the first mentioned washer, and a fastening passed through the spaced extensions and washers and the aforesaid plate to secure all together and to hold the saw frame in a relatively adjusted position.

In testimony whereof we affix our signatures in presence of two witnesses.

HENRY H. BOENKER. [L. S.]
WILLIAM D. SCHONE. [L. S.]

Witnesses:
PETER ARB,
ERNST SCHNEDLER.